United States Patent
Caskey et al.

(10) Patent No.: US 9,122,548 B2
(45) Date of Patent: Sep. 1, 2015

(54) CLIPBOARD FOR PROCESSING RECEIVED DATA CONTENT

(75) Inventors: Sasha P. Caskey, New York, NY (US); Dimitri Kanevsky, Ossining, NY (US); Sameer Maskey, New York, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 13/547,932

(22) Filed: Jul. 12, 2012

(65) Prior Publication Data

US 2014/0019697 A1   Jan. 16, 2014

(51) Int. Cl.
| G06F 17/00 | (2006.01) |
| G06F 9/54 | (2006.01) |
| G06F 12/16 | (2006.01) |

(52) U.S. Cl.
CPC ............... *G06F 9/543* (2013.01); *G06F 12/16* (2013.01)

(58) Field of Classification Search
CPC ................................ G06F 9/543; G06F 17/24
USPC ........................................................ 715/271
See application file for complete search history.

(56) References Cited

U.S. PATENT DOCUMENTS

| 7,382,933 | B2 | 6/2008 | Dorai et al. | |
| 2004/0122809 | A1* | 6/2004 | Clark et al. | 707/3 |
| 2006/0155785 | A1* | 7/2006 | Berry et al. | 707/204 |
| 2007/0055695 | A1 | 3/2007 | Dorai et al. | |
| 2008/0288453 | A1* | 11/2008 | Smetters et al. | 707/3 |
| 2010/0138502 | A1* | 6/2010 | Miller et al. | 709/206 |
| 2012/0078626 | A1* | 3/2012 | Tsai et al. | 704/235 |
| 2012/0096368 | A1* | 4/2012 | McDowell | 715/748 |

OTHER PUBLICATIONS

"Writer FAQ—Formatting Text—2.4 How to Selext Multiple Parts of the Text" ftp://bbquotes.byu.edu:24/Deanne/OpenOfficeSmall/wiki.services.openoffice.org/wiki/Do . . . , Mar. 14, 2008, 14 pages.
Caskey et al., "Clipboard for Processing Received Data Content," U.S. Appl. No. 13/565,360, filed Aug. 2, 2012, 28 pages.
Office action dated Oct. 6, 2014, regarding U.S. Appl. No. 13/565,360, 22 pages.

* cited by examiner

*Primary Examiner* — Kavita Padmanabhan
*Assistant Examiner* — Andrew McIntosh
(74) *Attorney, Agent, or Firm* — Yee & Associates, P.C.; Louis J. Percello

(57) ABSTRACT

An embodiment of the invention directed to a method is associated with data content, comprising discrete data portions including first data and second data portions separated from each other in the data content. A copy operation is implemented on data portions so that at least some of the data portions are each copied to a buffer, which include the first and second data portions. A paste operation is carried out to present each of the copied data portions as an input for an output data selection task. Prespecified criteria is used in the output data selection task to select a number of the copied data portions to be selected data for a given purpose, the selected number of copied data portions being less than data portions presented by the paste operation, and the selected copied data portions including the first and second data portions.

19 Claims, 4 Drawing Sheets

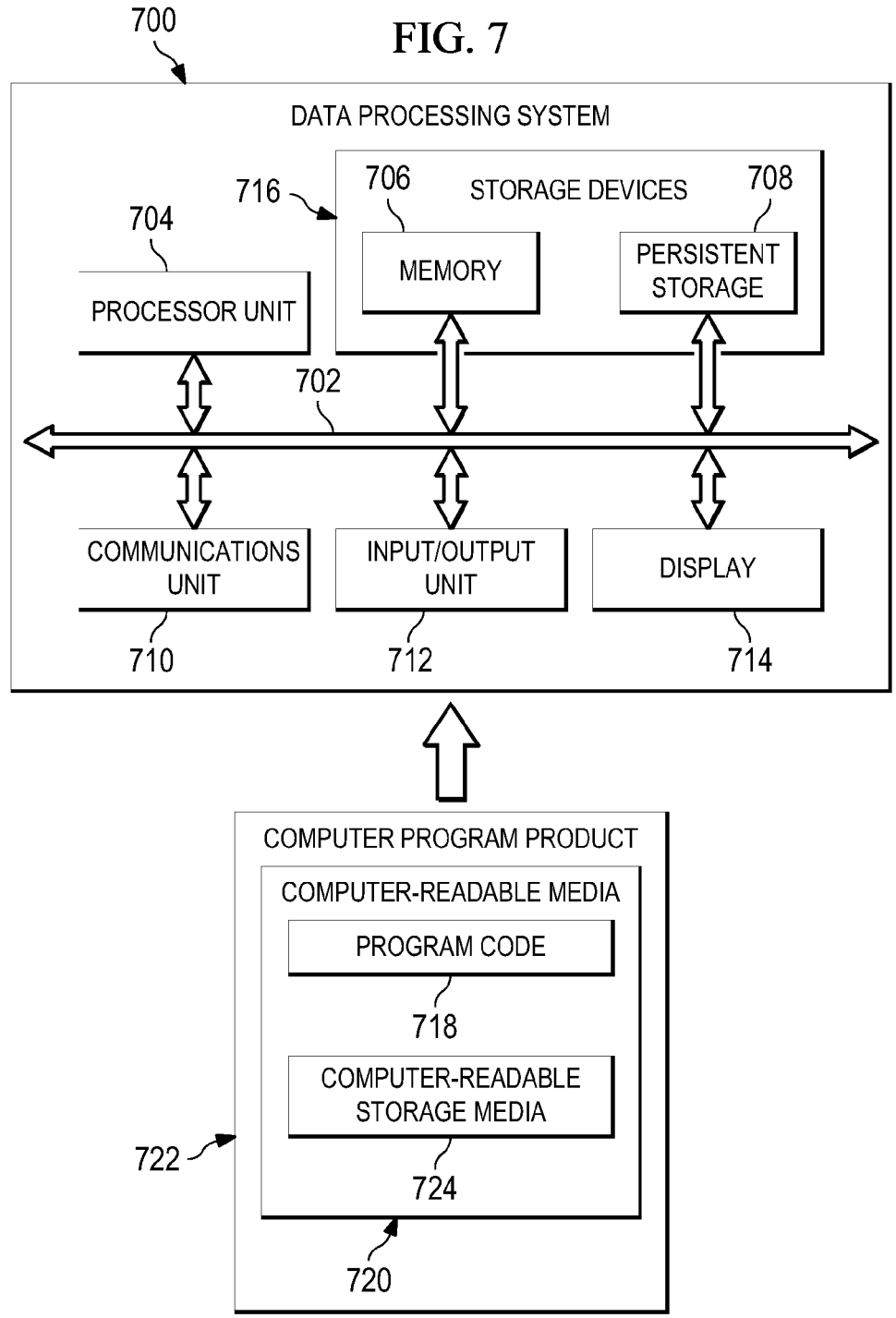

CLIPBOARD FOR PROCESSING RECEIVED DATA CONTENT

BACKGROUND

1. Field

The invention disclosed and claimed herein generally pertains to a smart copy clipboard. More particularly, the invention pertains to a computer clipboard provided with intelligent capabilities, for selecting portions of specified data content, including data content portions which are non-contiguous or disjointed portions in relation to each other.

2. Description of the Related Art

As is known by those of skill in the art, a computing clipboard is a software facility that can be used for short term data storage and/or data transfer between documents or applications, via copy and paste operations. It is usually implemented as an anonymous, temporary data buffer that can be accessed from most or all programs within an environment, via defined programming interfaces. Frequently, it would be desirable to use a clipboard function for a purpose such as summarizing a conversation that the user was having with another user, by means of a messenger such as a Sametime platform or the like. It might also be desirable to extract out certain portions of such a conversation, and paste them to someone else. However, currently used clipboard techniques are generally not adaptable for these purposes.

Moreover, current clipboard techniques generally do not allow two data portions which are disjointed, or are separated or not located contiguous to each other in a body of data content, to be copied in a single operation. Rather, only a portion of text that can be shadowed in "one pass" is able to be copied and pasted.

In addition, users may want to chat or communicate through different messenger services during a conversation between them. This could happen if users start from a messenger platform such as Sametime, then move to another messenger such as gtalk to discuss some private matters, and then move to Skype to see each other via a webcam. It would be desirable to provide a single intelligent capability that could acquire, filter and process data pertaining to these interactions across different messengers. Yet another need is to provide an intelligent copy and paste operation to acquire and process data across different media, such as audio, text and video.

SUMMARY

Embodiments of the invention provide a method, apparatus and computer program product that automatically copies prespecified portions of a conversation or exchange of data between two users, or a group of people. One embodiment, associated with copy and paste operations of an intelligent clipboard, is provided with criteria for identifying portions of pasted data content that are to be retained, and selectively processed, and other data portions that are to be extracted or filtered from the pasted data.

An embodiment of the invention directed to a computer implemented method is associated with specified data content comprising a plurality of discrete data portions, which include at least a first data portion and a second data portion that are selectively separated from each other in the data content. The method includes implementing a copy operation on at least some of the data portions of the plurality, so that at least some of the data portions are each copied to an initial storage buffer, wherein the copied data portions include the first data portion and the second data portion. The method further includes carrying out a paste operation to present each of the copied data portions as an input for an output data selection task. Prespecified criteria is used in the output data selection task to select a number of the copied data portions to be input data for a given purpose, wherein the selected number of copied data portions is less than the number of specified data portions presented by the paste operation, and the selected copied data portions includes the first and second data portions.

BRIEF DESCRIPTION OF THE SEVERAL VIEWS OF THE DRAWINGS

FIG. 7 is a block diagram showing a computer or data processing system that may be used in implementing embodiments of the invention.

DETAILED DESCRIPTION

Figure 1:
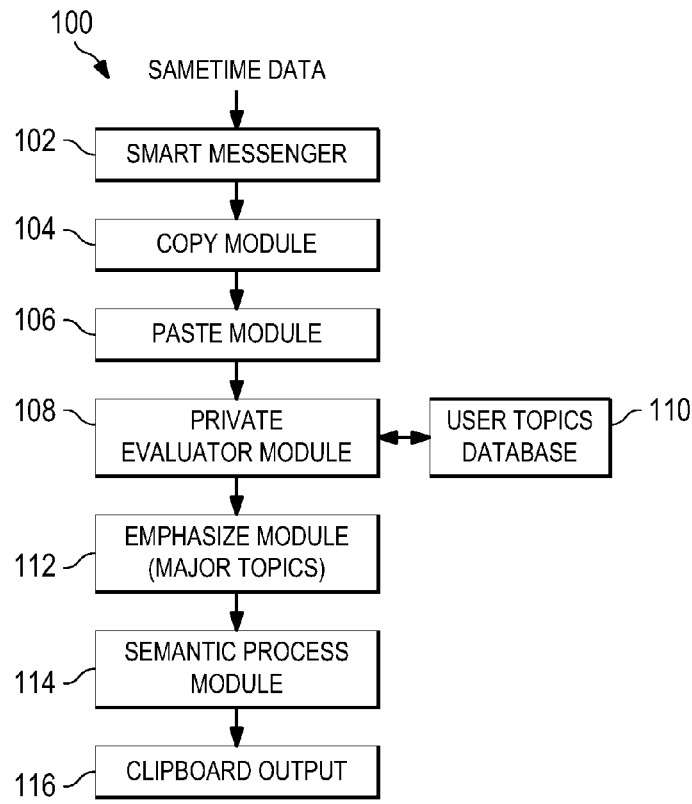
FIG. 1 is a schematic view showing components for a first embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown a configuration of components for implementing an embodiment of the invention, which comprises an intelligent computing clipboard 100. Generally, clipboard 100 is adapted to process text on the fly, in association with copy and paste operations. Component 102 comprises a module referred to as a smart messenger 102, which receives input data content. Copy module 104 provides a user with the opportunity to select and copy some or all of the input data content for further processing by other components of clipboard 100.

As an exemplary embodiment, a user could be engaged in a conversation with a colleague, using a messenger such as Sametime. Sametime is a client—server application and middleware platform for instant messaging and collaborations. The user could decide that a particular portion of the Sametime conversation should be sent to a second colleague. More particularly, the user could decide that discussion about a particular matter or subject, which was identifiable by certain words or terms, should be sent to the second colleague.

In order to carry this out, FIG. 1 shows a stream of textual data content routed to smart messenger 102, wherein the smart messenger has a module that is adaptable to detect significant terms included in the data content. Accordingly, smart messenger 102 is initially set to detect the words and terms that identify the particular subject matter. Then, copy module 104 of clipboard 100 is operated to copy only data segments of the continuing conversation between the user and first colleague that are associated with these words and terms. The copied data segments are placed in a common storage buffer or the like (not shown) and other portions of the conversation are disregarded by clipboard 100.

Referring further to FIG. 1, at a subsequent time a paste module 106 pastes all conversation data segments that were copied into the storage buffer to a private evaluator module 108. It is recognized that the conversation between the user and the first colleague could include subject matter or topics that are intended to remain private to them. Accordingly, program software of clipboard 100 contains a list which identifies such topics. Private evaluator module 108 scans pasted data content for any portion thereof that is included in the list of private topics, and removes such portion from the data content.

FIG. 1 shows that the remaining data content is further evaluated by information provided by a user topics database 110. This information comprises a list of major topics or subtopics associated with the ongoing conversation. This list is used at an emphasize module 112 to scan each line of text of the remaining data content, to ensure that each such line falls into one of the major subtopics. If a scanned line of the conversation is found not to be in one of these subtopics, it is removed from the data content.

At semantic process module 114, semantic processing is applied to the then remaining data content, which comprises the remaining text segments excerpted from the textual conversation data as described above. These remaining text segments are thereby rendered into a more coherent or grammatical form. The clipboard output module 116 comprises a clipboard output, which can now be sent to the second colleague.

It will be appreciated that the clipboard output data can include two or more data portions or segments that were disjointed, or noncontiguous, in the original conversation data content. That is, each of such noncontiguous data portions were separated from each other in the original data content by other data portions, which were removed from the clipboard output data by one of the processing tasks described above.

Figure 2:
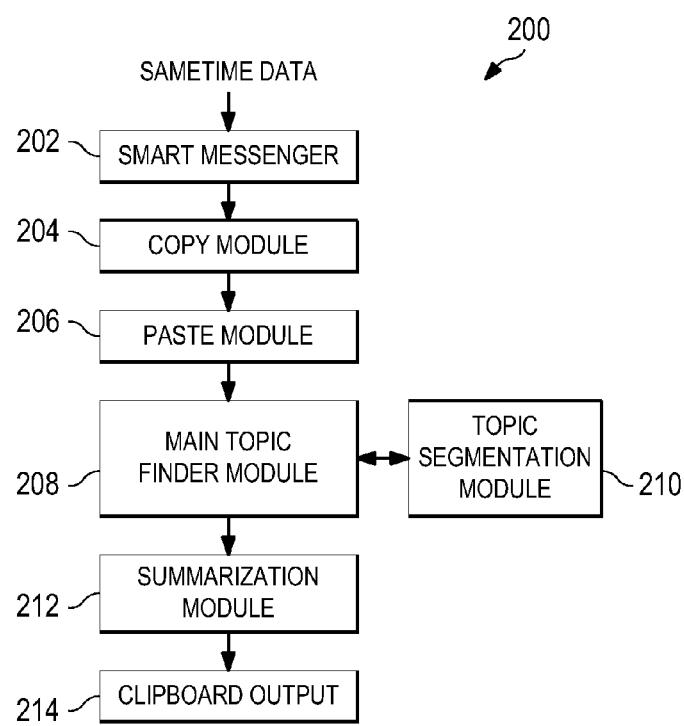
FIG. 2 is a schematic view showing components for a second embodiment of the invention.

Referring to FIG. 2, there is shown an embodiment of the invention comprising a configuration of components for a computing clipboard 200. Clipboard 200 includes a smart messenger 202, a copy module 204 and paste module 206 that are similar or identical to smart messenger 102, copy module 104 and paste module 106, respectively, of FIG. 1. In some embodiments of the invention, components and functions of clipboard 100 and 200 could be combined into a single entity, which could be used for multiple tasks or applications.

In the embodiment of FIG. 2, smart messenger 202 receives textual data content generated by an ongoing conversation between a user and a colleague, who are communicating over a Sametime messenger as described above in connection with FIG. 1. However, in this situation the user wants to produce a summary of the principal or main points of the conversation for some purpose, such as to send the summary to a second colleague by e-mail. In order to achieve this purpose, the user first adjusts smart messenger 202 to detect or recognize significant terms occurring during the conversation. These could include words or terms which occur with a predefined frequency, which specifically pertain to the main points of the conversation, or which are specifically input into the smart messenger 202 by the user. When such terms are detected by smart messenger 202, segments of the conversation including these terms are copied by copy module 204 to a storage buffer, as described above. However, other portions or segments of conversation data are not copied by module 204. Subsequently, the copied data segments or portions are pasted or presented by paste module 206 to a main topic finder module 208.

The main topic finder module 208 is a module that uses the terms and sentences from the copied and pasted material to identify or interpret the main topic or topics of conversation. Main topic finder module 208 is usefully assisted in this task by a topic segmentation module 210, which segments the text data received by main topic finder module 208 into units that indicate possible respective topics. The topics are then summarized by summarization module 212, which may use abstractive summarization techniques. Module 212 provides the summary as a clip board output 214.

It will be appreciated that clipboard 200 could also include components such as those described above in connection with FIG. 1, to ensure that any private matters discussed in the conversation are not included in clipboard output 214.

Figure 3:
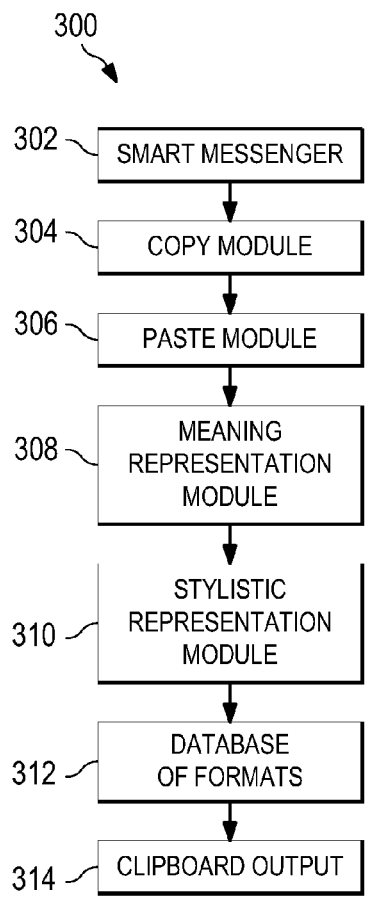
FIG. 3 is a schematic view showing components for a third embodiment of the invention.

Referring to FIG. 3, there is shown an embodiment of the invention comprising a computing clipboard 300. Clipboard 300 includes a smart messenger 302, a copy module 304, and paste module 306, which are similar or identical to respective corresponding components of FIG. 1. In some embodiments of the invention, components and functions of clipboards 100, 200 and 300 could all be included in a single entity that was capable of performing multiple tasks or applications. A single smart messenger, copy module and paste module could then be used to support whatever tasks or applications were selected.

In the embodiment of FIG. 3, smart messenger 302 receives textual data content during a conversation between a user and a colleague, by using a messenger such as Sametime or the like as discussed above. In the scenario of clipboard 300, the user wants to take certain data content of the conversation, and convert such content into a statement or document set forth in formal text. As described above, smart messenger 302 can be adjusted to recognize words and terms that pertain to certain conversation topics or subject matter. This subject matter is then copied by copy module 304, while other content of the conversation is disregarded by clipboard 300. Copied subject matter of the conversation is pasted by paste module 306 to a meaning representation module 308.

While not shown in FIG. 3, a useful step in the process thereof would be to use a private evaluator module and related components, as described above in connection with FIG. 1, between paste module 306 and meaning representation module 308. These components would be used to remove private information from the pasted content, before such content was received by meaning representation module 308.

Meaning representation module 308 is a component which is configured to analyze a portion of conversation data content, comprising a textual segment or chunk, and to determine or extract the meaning of such segment. Meaning representation module 308 further determines topics or subjects to which respective segments belong. Stylistic representation module 310 is operable to place respective textual segments in a format that is appropriate for a task or application which is to receive the data content. For example the data content could be formatted as a succession of paragraphs, wherein textual segments that pertain to the same topic would all be grouped into the same paragraph.

Module 312 is a database which provides output format definitions. The output of clipboard 300 is provided in the proper format at clipboard output 314.

Figure 4:
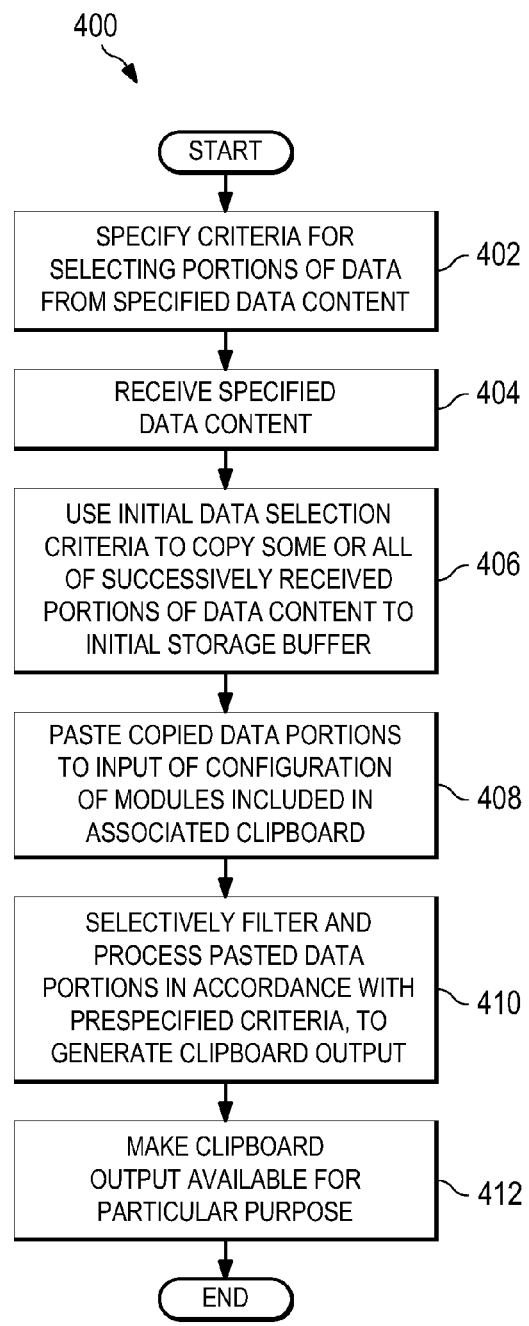
FIG. 4 is a flowchart showing steps for a method comprising an embodiment of the invention

Referring to FIG. 4, there is shown a method comprising generic steps for embodiments of the invention. Respective steps of FIG. 4 are exemplified more specifically by embodiments described herein, such as those disclosed in connection with FIGS. 1-3. However, the invention is by no means limited thereto.

At step 402, criteria is specified which is to be used in determining what data portions of received data content are to be selected for retention, wherein the retained data portions are processed to provide a clipboard output. Other portions of received data are filtered out. Also, while some of the data selection or filtering takes place initially, or prior to the copy and paste operations, other data filtering occurs after such operations.

As an example of initial data filtering of step 402, smart messenger 102 of FIG. 1 is disclosed as being operable to recognize only data portions of received conversation data that pertain to particular words and terms, wherein the words and terms identify particular topics or subject matter. Other subject matter of the conversation data is disregarded. Smart messenger 202 of FIG. 2 is likewise operable to recognize only particular significant terms in the conversation data. Accordingly, an essential preliminary step for both the embodiments of FIGS. 1 and 2, is to specify criteria for adjusting or configuring the smart messenger to recognize only the particular terms of interest.

Moreover, as described above, the capabilities of clipboards 100, 200 and 300 could be usefully combined into a single entity or configuration, which was able to perform multiple tasks. With an arrangement of this type, it would clearly be necessary for a user to initially select the particular task or tasks that are to be carried out, and thus define the particular configuration of modules that would be needed, following the copy and paste operations. For example, for the embodiment of FIG. 1, the user would have to define a configuration that provides a clipboard output which is limited to a particular subject, and from which private matter of the conversation is excluded. In the embodiment of FIG. 3, the defined configuration would need to provide a clipboard output comprising subject matter of a conversation set forth in formal text, and in a succession of paragraphs.

In embodiments of FIG. 4, the above task selections are made by instructions or other criteria which are specified at step 402. Usefully, a user interface of a system associated with the clipboard is provided, in order to implement step 402. The user interface could include a drop-down menu or the like, with different options for selecting a clipboard output. The user could also be provided with buttons for use in selecting aspects of the clipboard output.

Referring further to FIG. 4, specified data content is received at step 404. In embodiments exemplified by FIGS. 1-3, the data content is a stream of textual data pertaining to a conversation, and is provided by a Sametime messenger. However, in other embodiments the data could be provided by other messenger services, or by multiple messenger services. For example, participants could switch between messengers, such as Sametime and g talk, during their conversation. Data content produced by both of these messengers would then be directed to a clipboard comprising an embodiment of the invention, for processing thereby.

Moreover, input data for embodiments of the invention can be produced by sources of audio data and video data, as described hereinafter in further detail in connection with FIG. 5. Thus, as an example, received data content can comprise one component provided by Sametime, and another component provided by the Skype messenger service.

At step 406, an initial data selection criteria is used to implement a copy operation, in order to copy either all or only some portions of successively received data content to an initial data storage buffer. For example, criteria could be a particular adjustment or setting of messenger 102 of FIG. 1, to detect or accept only portions of received data which include words and terms that identify particular subject matter.

At step 408, a paste operation is carried out, to paste copied data from the buffer to a configuration of modules included in the associated clipboard. For a particular application, and to provide a clipboard output that has particular characteristics, the configuration of modules would be determined by the instructions specified at step 402 of FIG. 4. For example, the module configuration for the embodiment of FIG. 1 would comprise modules 108-114. The module configuration for the embodiment of FIG. 2 would comprise modules 208-214.

At step 410, the pasted data portions are filtered and processed by the configuration of modules, as determined by the specified criteria, in order to provide an intended output at step 412. For example, the embodiment of FIG. 1 provides a textual output pertaining to a particular subject, from which private matter has been extracted.

It is anticipated that the above approach would remove a significant burden from the user, who would otherwise have to post what he/she wants to copy and paste. In a useful embodiment, copy step 406, paste step 408 and processing step 410 are carried out automatically, as portions or segments of data content are successively received.

Figure 5:
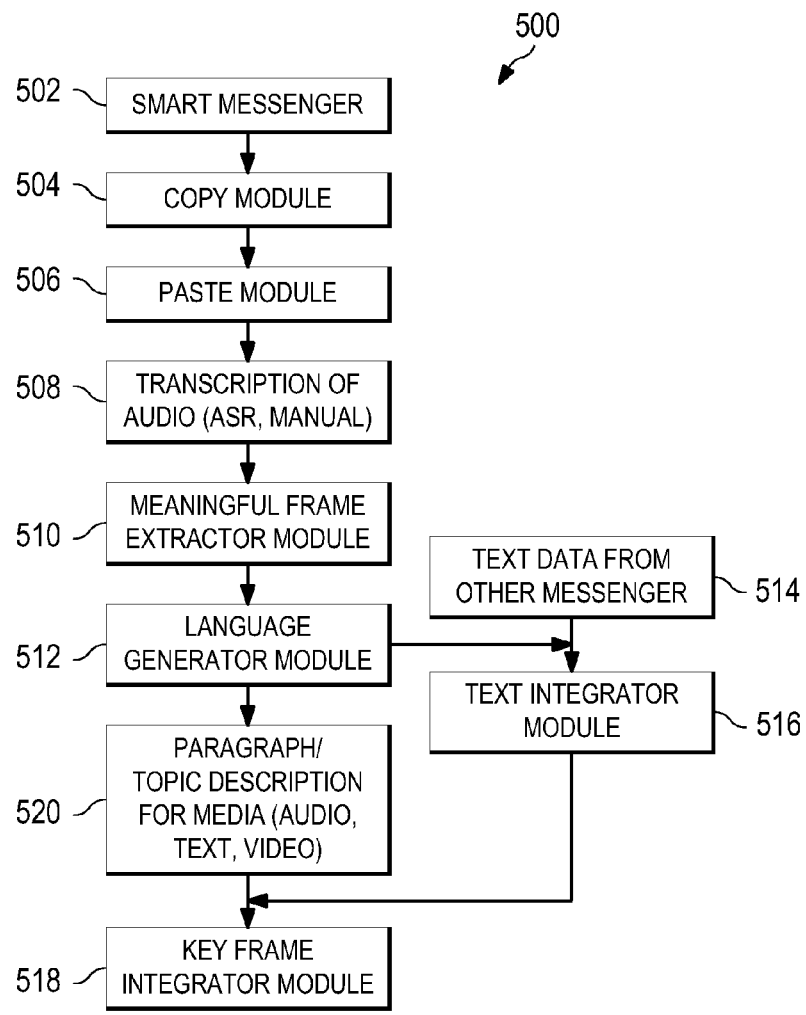
FIG. 5 is a schematic view showing components for a further embodiment of the invention.

Referring to FIG. 5, there is shown an embodiment of the invention comprising a computing clipboard 500, which includes a source of video data 502. Usefully, the video data 502 is accompanied by related audio data. For example, the source of video data 502 could comprise a messenger service such as Skype, and the data provided thereby could be an audio-video (A/V) conversation about different topics or subject matter, between a user and a colleague. The video component could comprise moving images of the participants, but could also include written or graphic images, such as written formulas or diagrams that pertained to their conversation.

FIG. 5 shows clipboard 500 further comprising a copy module 504, a paste module 506 and an audio speech recognition (ASR) module 508. As successive data portions are received by clipboard 500, they are copied by copy module 504 and pasted by paste module 506 to ASR module 508. The ASR module 508 carries out an audio speech to text conversion, to render the audio component of the received conversation data into a stream of readable text.

Module 510 is configured to extract meaningful or significant frames from the video data. For example, the video data could include a white board that displayed an important formula, which was a topic of the conversation. A code or like device applied to the whiteboard frame would be recognized by the meaningful frame extractor module 510, and the module 510 would extract and save the whiteboard frame.

Referring further to FIG. 5, there is shown a language generator module 512 which is disposed to receive the stream of text from ASR module 508, wherein the text is a representation of the ongoing conversation. Language generator module 512 is provided to analyze its textual input data, and to generate textual segments or chunks. Each chunk of text has a meaning which is extracted from its contents. Module 512 is thus similar or identical to module 308, described above in connection with FIG. 3.

FIG. 5 further shows a source 514 of text data from one or more other messenger services. For example, data output from module 512, derived from video data of a conversation between a user and colleague, could include a topic which was also discussed by the user and colleague using a Sametime link. Accordingly, clipboard 500 is provided with a text integrator module 516. Module 516 is configured to integrate text from both modules 512 and 514, which pertains to a common subject or topic, into a single statement or document.

Clipboard 500 is provided further with a key frame integrator module 518. This module is adapted to integrate textual output of module 516 with video frames extracted by module 510 that correspond thereto. In one embodiment, both the frames and the text could be encoded with times at which they were respectively produced. The timing information could then be used by module 518 to readily recognize a relationship between particular text data and its corresponding video frames.

Module 520 of FIG. 5 receives the output of key frame integrator module 518, and arranges material thereof in the form of formal text, with paragraphs. Each paragraph usefully contains material of a particular topic, and may be provided with a topic scripter. Module 520 thus provides output information that is derived by integrating or combining related data which may be furnished in different media forms, including video, audio and textual forms.

Figure 6:
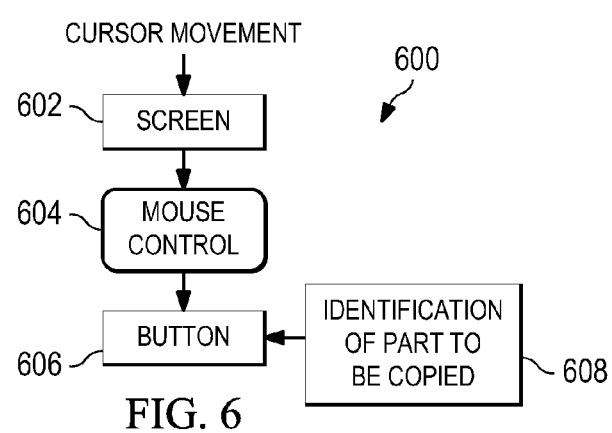
FIG. 6 is a schematic view showing a useful feature for embodiments of the invention.

Referring to FIG. 6, there are shown components for a device 600, which can advantageously be used with clipboards or other embodiments of the invention. More particularly, device 600 is intended for use in selecting material for cut and paste operations in connection with a clipboard.

In a conventional clipboard arrangement, text or other data content is displayed on a monitor screen 602 or the like. A user can operate a mouse control 604 to move a cursor along text or other content, which is intended to be copied and pasted. Typically, such content is indicated by applying a highlighting color thereto, which clearly contrasts with the surrounding background color of the display screen. Moreover, every element of the content which has been selected for a given copy and paste operation is contiguous or adjacent to at least one other selected element. No selected element is separated from other selected elements by elements which have not also been selected for the given operation.

In contrast to the above conventional arrangement, device 600 is provided with a button 606 and related components, which are configured to interact with mouse control 604. As mouse control 604 is being used to move the cursor along text or other content on screen 602, in order to select such content for clipboard copying, button 606 is operated. Such operation deactivates further selection of displayed elements for copying by mouse control 604, as the cursor continues to move along text or other content on screen 602. Then, when button 606 is again operated, mouse control 604 is enabled to again select displayed elements for copying, as the cursor continues to move.

To further illustrate the operation of device 600, it is assumed that screen 602 displays a line of text comprising the letters "A B C D E F G H I". To select content for a copy and paste operation, the cursor is moved along this line of text, from left to right. The letters A, B and C are thus selected for copying. Then, before the cursor reaches the letter D, button 606 is operated to deactivate the content selection function. The cursor is moved across letters D, E and F, but these letters are not selected for copying. When the cursor reaches letter G, button 606 is again operated, so that letters G, H and I are selected for the copy and paste operation.

FIG. 6 further shows a module 608, which can be provided with the identification of content portions which are to be copied. Module 608 is also connected to operate button 606, in accordance with such identifications.

By providing the device 600, a single copy and paste operation can select two or more portions of text or other data content that are separated from each other in the data content. As used herein, two data portions are separated from each other, if they are separated from each other in the data content by one or more other data portions that are not selected for the copy and paste operation. Two data portions would also be separated from each other, if they were received by the clipboard from different messengers, or in data content of different media.

FIG. 7 depicts a diagram of a data processing system in accordance with an illustrative embodiment. Data processing system 700 is an example of a computer, which may be used to implement one or more components of embodiments of the invention, and in which computer usable program code or instructions implementing the processes may be located for the illustrative embodiments. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a set of one or more processors or may be a multiprocessor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Memory 706, in these examples, may be, for example, a random access memory, or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in these examples, provides for communication with other data processing systems or devices. In these examples, communications unit 710 is a network interface card. Communications unit 710 may provide communications through the use of either or both physical and wireless communications links.

Input/output unit 712 allows for the input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code, in the different embodiments, may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722. In one example, computer readable media 720 may be computer readable storage media 724 or computer readable signal media 726. Computer readable storage media 724 may include, for example, an optical or magnetic disc that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 718 may be downloaded over a network to persistent storage 708 from another device or data processing system through computer readable signal media 726 for use within data processing system 700. For instance, program code stored in a computer readable storage media in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide physical or architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In association with specified data content comprising a plurality of discrete data portions, which include at least a first data portion and a second data portion that are selectively separated from each other in the specified data content, a method comprising:

utilizing, by a computer, a plurality of different messenger services during a conversation between a user of the computer and a set of other users connected via a network, wherein the computer receives the plurality of discrete data portions of the specified data content during the conversation utilizing the plurality of different messenger services;

selecting, by the computer, data portions of the plurality of discrete data portions received from the plurality of different messenger services being utilized during the conversation between the user and the set of other users;

copying, by the computer, at least some of the selected data portions to an initial storage buffer of the computer using a copy operation, wherein copied data portions include the first data portion and the second data portion;

performing, by the computer, a paste operation to present each of the copied data portions copied to the initial storage buffer as an input for an output data selection task;

selecting, by the computer, a number of the copied data portions that is less than all of the copied data portions copied to the initial storage buffer using prespecified criteria in the output data selection task to be input data for a given purpose, wherein the selected number of the copied data portions includes the first data portion and the second data portion; and summarizing, by the computer, each copied data portion in the selected number of the copied data portions as a clipboard output using abstractive summarization.

2. The method of claim 1, wherein:

the copied data portions comprise textual data content, and wherein the prespecified criteria comprise prespecified information contained on a list.

3. The method of claim 2, wherein:

the prespecified information contained on the list comprises one or more topics, and wherein a copied data portion is selected for the given purpose in response to the copied data portion being associated with at least one of the one or more topics.

4. The method of claim 2, wherein:

the prespecified information contained on the list comprises one or more matters, and wherein a copied data portion associated with any of the one or more matters is excluded from selection for the given purpose.

5. The method of claim 1, further comprising:

detecting, by the computer, one or more particular terms, wherein the computer performs the copy operation on data portions associated with one or more of the one or more particular terms.

6. The method of claim 1, wherein:

the specified data content comprises textual data content generated by the conversation between the user and the set of other users, and wherein the given purpose includes placing respective copied data portions into a formal textual document comprising successive paragraphs, and wherein content included in a given paragraph pertains to a particular topic.

7. The method of claim 6, wherein:
the respective copied data portions are segmented into topical units.

8. The method of claim 1, wherein:
successive copy operations and paste operations are implemented automatically, as data portions of the specified data content are successively received for copy and paste operations.

9. The method of claim 1, wherein:
the specified data content comprises data portions from two or more different sources, and wherein the given purpose includes integrating data portions from the two or more different sources into a single output.

10. The method of claim 9, wherein:
at least two of the two or more different sources provide data portions of media types different from each other, and wherein the media types are selected from a group that includes at least textual, audio, and video media types.

11. The method of claim 9, wherein:
at least some of the copied data portions comprise speech recorded in audio form, and wherein the given purpose includes converting audio speech data to corresponding textual data.

12. The method of claim 9, wherein:
at least some of the copied data portions comprise video data, and wherein one or more selected frames are extracted from the video data.

13. The method of claim 1, wherein:
a control is manually operated by the user to select the first data portion and the second portion from the specified data content for implementation in a same copy operation.

14. In association with specified data content comprising a plurality of discrete data portions, which include at least a first data portion and a second data portion that are selectively separated from each other in the specified data content, a computer system comprising:
a bus system;
a storage device connected to the bus system, wherein the storage device stores program instructions; and
a processor connected to the bus system, wherein the processor executes the program instructions to:
utilize a plurality of different messenger services during a conversation between a user of the computer system and a set of other users connected via a network, wherein the computer system receives the plurality of discrete data portions of the specified data content during the conversation utilizing the plurality of different messenger services;
select data portions of the plurality of discrete data portions received from the plurality of different messenger services being utilized during the conversation between the user and the set of other users;
copy at least some of the selected data portions to an initial storage buffer of the computer system using a copy operation, wherein copied data portions include the first data portion and the second data portion;
perform a paste operation to present each of the copied data portions copied to the initial storage buffer as an input for an output data selection task;
select a number of the copied data portions that is less than all of the copied data portions copied to the initial storage buffer using prespecified criteria in the output data selection task to be input data for a given purpose, wherein the selected number of the copied data portions includes the first data portion and the second data portion; and
summarize each copied data portion in the selected number of the copied data portions as a clipboard output using abstractive summarization.

15. In association with specified data content comprising a plurality of discrete data portions, which include at least a first data portion and a second data portion that are selectively separated from each other in the specified data content, a computer program product comprising a non-transitory computer readable storage medium having program instructions embodied therewith, the program instructions executable by a computer to cause the computer to perform a method comprising:
utilizing, by the computer, a plurality of different messenger services during a conversation between a user of the computer and a set of other users connected via a network, wherein the computer receives the plurality of discrete data portions of the specified data content during the conversation utilizing the plurality of different messenger services;
selecting, by the computer, data portions of the plurality of discrete data portions received from the plurality of different messenger services being utilized during the conversation between the user and the set of other users;
copying, by the computer, at least some of the selected data portions to an initial storage buffer of the computer using a copy operation, wherein copied data portions include the first data portion and the second data portion;
performing, by the computer, a paste operation to present each of the copied data portions copied to the initial storage buffer as an input for an output data selection task;
selecting, by the computer, a number of the copied data portions that is less than all of the copied data portions copied to the initial storage buffer using prespecified criteria in the output data selection task to be input data for a given purpose, wherein the selected number of the copied data portions includes the first data portion and the second data portion; and
summarizing, by the computer, each copied data portion in the selected number of the copied data portions as a clipboard output using abstractive summarization.

16. The computer program product of claim 15, wherein:
the copied data portions comprise textual data content, and wherein the prespecified criteria comprise prespecified information contained on a list.

17. The computer program product of claim 16, wherein:
the prespecified information contained on the list comprises one or more topics, and wherein a copied data portion is selected for the given purpose in response to the copied data portion being associated with at least one of the one or more topics.

18. The computer program product of claim 16, wherein:
the prespecified information contained on the list comprises one or more matters, and wherein a copied data portion associated with any of the one or more matters is excluded from selection for the given purpose.

19. The computer program product of claim 15, further comprising:
detecting, by the computer, one or more particular terms, wherein the computer performs the copy operation on data portions associated with one or more of the one or more particular terms.

* * * * *